US008141568B2

(12) United States Patent
Huntington et al.

(10) Patent No.: US 8,141,568 B2
(45) Date of Patent: Mar. 27, 2012

(54) BREAKAWAY KNUCKLE FOR ARM OF A CAR WASH

(75) Inventors: Alan G. Huntington, Green Bay, WI (US); Kenneth R. Smith, Green Bay, WI (US); Michael K. Close, Black Creek, WI (US); Jeffrey A. Martin, Green Bay, WI (US); Peter T. Jensen, De Pere, WI (US)

(73) Assignee: Washworld, Inc., De Pere, WI (US)

( * ) Notice: Subject to any disclaimer, the term of this patent is extended or adjusted under 35 U.S.C. 154(b) by 515 days.

(21) Appl. No.: 12/348,905

(22) Filed: Jan. 5, 2009

(65) Prior Publication Data

US 2009/0173366 A1 Jul. 9, 2009

Related U.S. Application Data

(60) Provisional application No. 61/018,795, filed on Jan. 3, 2008.

(51) Int. Cl.
*B08B 3/02* (2006.01)
(52) U.S. Cl. ........................................ 134/123; 134/172
(58) Field of Classification Search .................. 134/123, 134/198
See application file for complete search history.

(56) References Cited

U.S. PATENT DOCUMENTS

| 3,543,774 | A * | 12/1970 | Trasp | 134/57 R |
|---|---|---|---|---|
| 4,955,538 | A * | 9/1990 | Laube et al. | 239/1 |
| 6,372,053 | B1 * | 4/2002 | Belanger et al. | 134/34 |
| 6,595,221 | B2 * | 7/2003 | Jones et al. | 134/57 R |
| 7,100,621 | B2 * | 9/2006 | Johnson | 134/123 |
| 7,314,285 | B2 * | 1/2008 | Ruse et al. | 359/841 |
| 7,380,558 | B2 * | 6/2008 | Krause et al. | 134/56 R |
| 7,559,333 | B2 * | 7/2009 | Belanger | 134/180 |

FOREIGN PATENT DOCUMENTS

SU             721598     *  3/1980

* cited by examiner

*Primary Examiner* — Frankie L Stinson
(74) *Attorney, Agent, or Firm* — Joseph S. Heino; Patrick M. Bergin

(57) ABSTRACT

A breakaway knuckle for an arm of a car wash is disclosed. The knuckle allows the arm of a car wash to receive an impact from a vehicle without breaking and return the arm to its original position automatically. The knuckle preferably comprises a joint having a series of inclined grooves and corresponding balls. The knuckle is spring loaded to actuate the return of the arm to an in-use position after an impact, and the balls roll into the grooves to hold the arm in place.

6 Claims, 6 Drawing Sheets

BREAKAWAY KNUCKLE FOR ARM OF A CAR WASH

CROSS-REFERENCE TO RELATED APPLICATION

This application claims priority under 35 U.S.C. §119(e) to U.S. Provisional Application Ser. No. 61/018795, filed Jan. 3, 2008 and entitled "Breakaway Knuckle for Arm of a Car Wash," the contents of which are hereby incorporated by reference in their entirety.

BACKGROUND OF THE INVENTION

1. Field of the Invention

The present invention relates to a breakaway knuckle for an arm of a car wash that is adapted to sustain impact from a vehicle and return to an operable position automatically.

2. Discussion of the Related Art

Automatic automobile washing assemblies having spray arches are generally known. The spray arches usually comprise a horizontal arm and a vertical arm bearing spray nozzles such that the horizontal arm is able to spray the top of a vehicle and the vertical arm extends downward to spray the sides of the vehicle. Such assemblies often include a means for breaking away under impact so that, in the event the vertical arm inadvertently comes into contact with the vehicle, the impact does not damage the vehicle being washed and does not damage the assembly itself.

A shear bolt is commonly employed in such assemblies. The bolt is disposed between the horizontal arm and the vertical arm of the spray arch, and is designed to shear or break away when the spray arch is impacted by an automobile. Such devices, however, require that the shear bolt be replaced after an impact before the car wash may be used again.

What is therefore needed is a device configured to allow for breakaway of the spray arch of a car wash assembly that is capable of returning to its initial position after an impact thereto. Such device preferably does not require human intervention or any other outside mechanical force after an impact to the arm, but rather has a mechanism designed to automatically return the arm to its original position, thereby reducing down time for the car washing assembly and minimizing repair and maintenance costs.

SUMMARY OF THE INVENTION

A breakaway knuckle for an arm of a car wash configured to accommodate an impact from a vehicle and return the arm to its original position thereafter is disclosed herein. The knuckle of the present invention comprises a joint having a series of inclined grooves and balls designed to ride in the grooves. The knuckle is spring loaded and the balls roll into the grooves and aid in returning the arm to its in-use position.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 2:
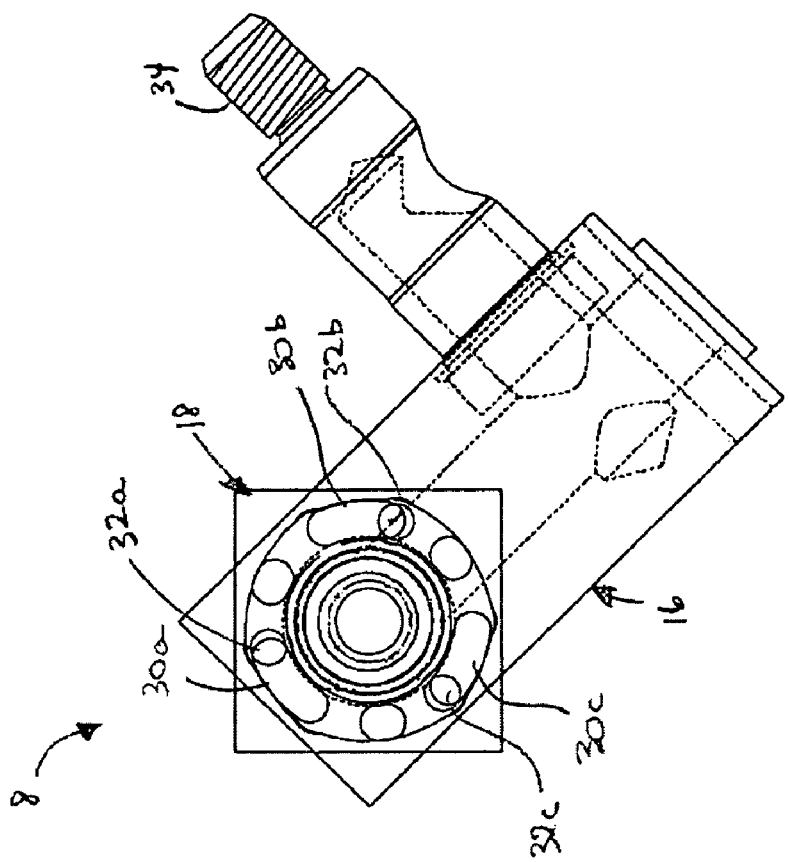
FIG. 2 is a top plan view of the device of FIG. 1 in a second position.

A car wash bay typically has a vehicle entrance, a vehicle wash area, and a vehicle exit. A gantry (not shown) is mounted within the bay above the vehicle wash area, and is movable across the entire length of a vehicle in the wash area. A spray arch assembly 8 comprising a horizontal arm 10 and a vertical arm 12 is mounted on the gantry.

In a preferred embodiment of the invention, a joint comprising a first portion or body 14 and a second portion or body 16 is interposed between horizontal arm 10 and vertical arm 12, with first portion 14 supporting horizontal arm 10 and second portion 16 supporting vertical arm 12. First portion 14 comprises a manifold weldment for the horizontal (top) arm of the spray arch, and second portion 16 comprises a manifold weldment for the vertical (side) arm of the spray arch. A breakaway knuckle assembly 18 is interposed between first portion 14 and second portion 16 to allow horizontal arm 10 to be separated from vertical arm 12, effectively "breaking" the spray arch.

Figure 1:
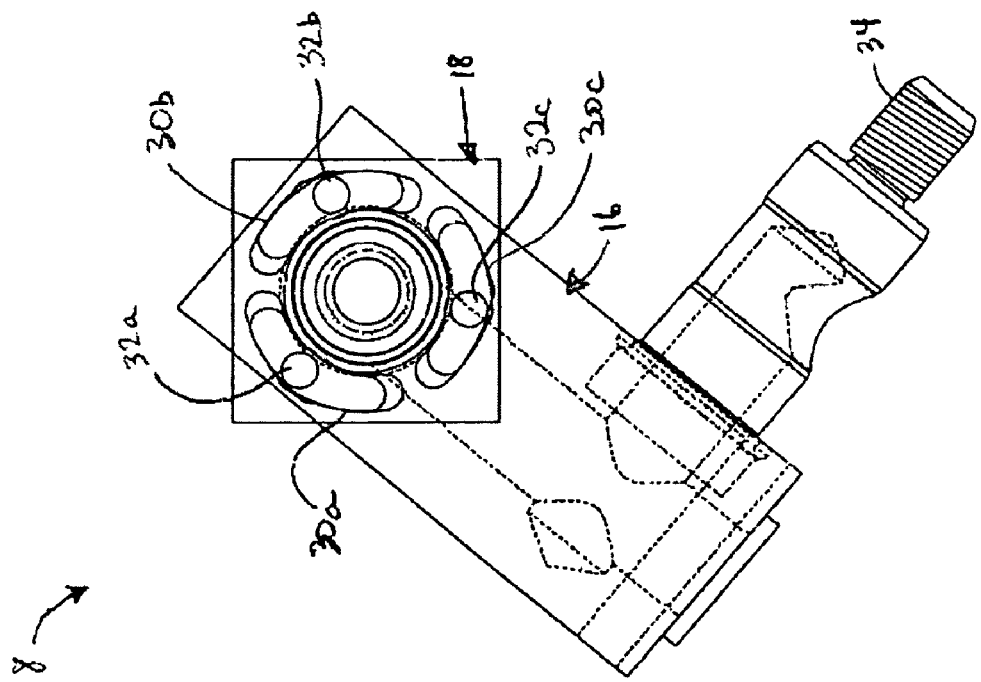
FIG. 1 is a top plan view of a preferred embodiment of the device of the present invention in a first position.
Figure 4:
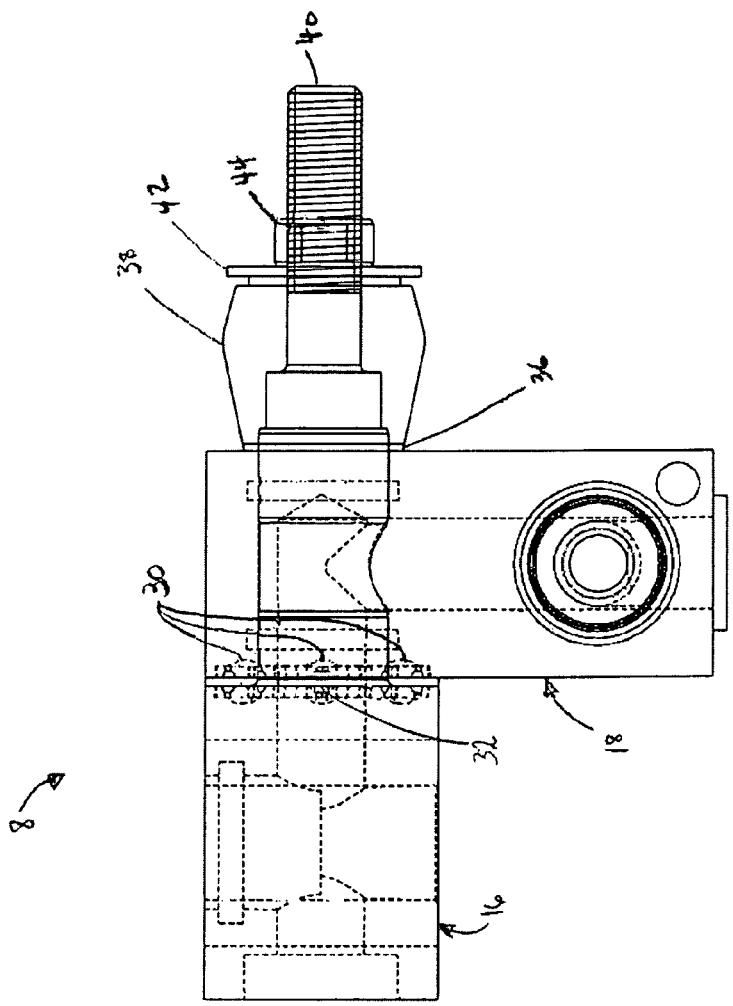
FIG. 4 is a side view of the device of FIGS. 1-3.
Figure 3:
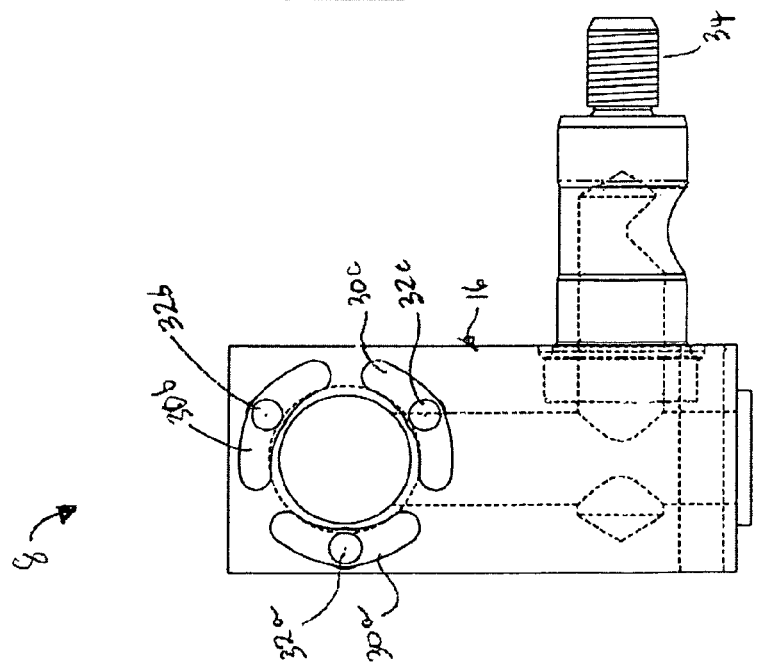
FIG. 3 is an end view of the device of FIGS. 1 and 2.
Figure 5:
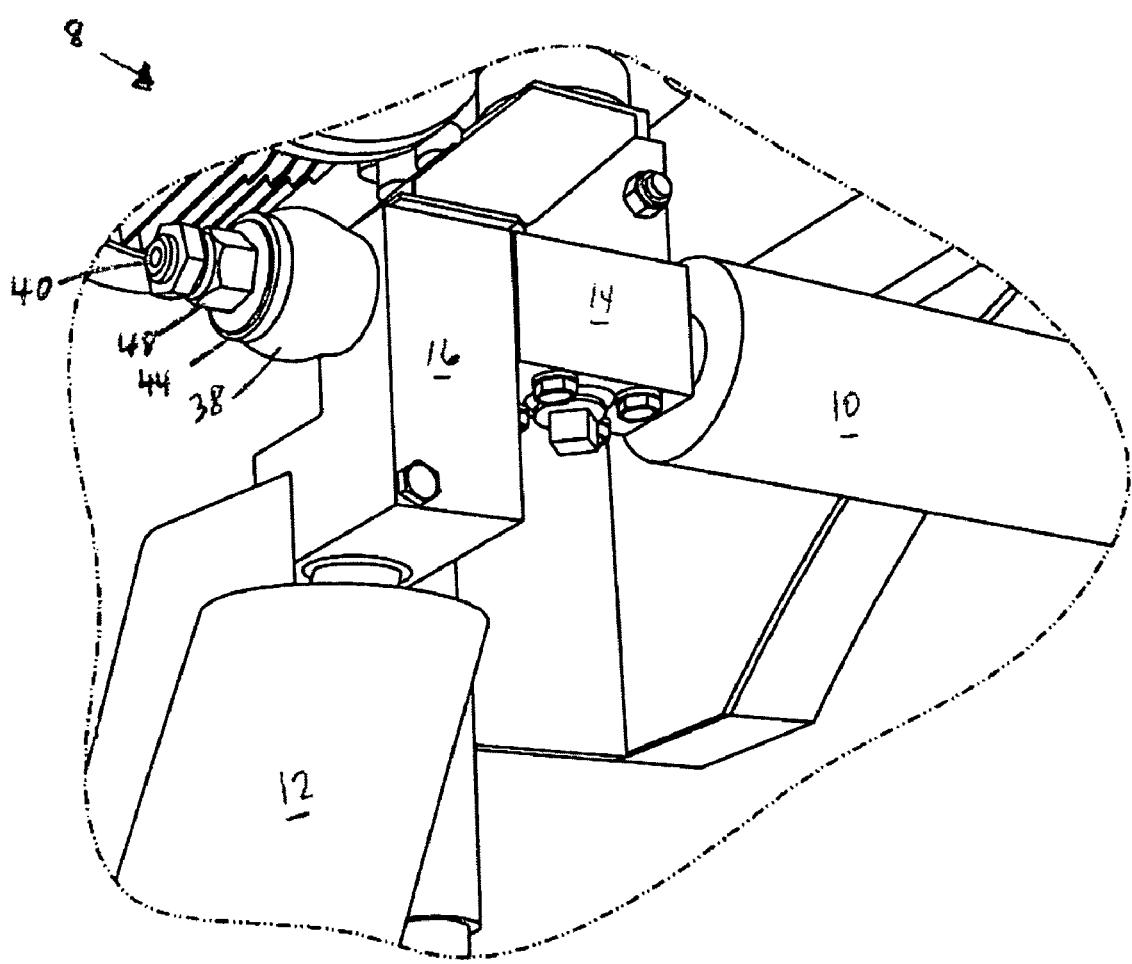
FIG. 5 is a perspective view of a preferred embodiment of the device of the present invention, shown in place within a wash bay.
Figure 6:
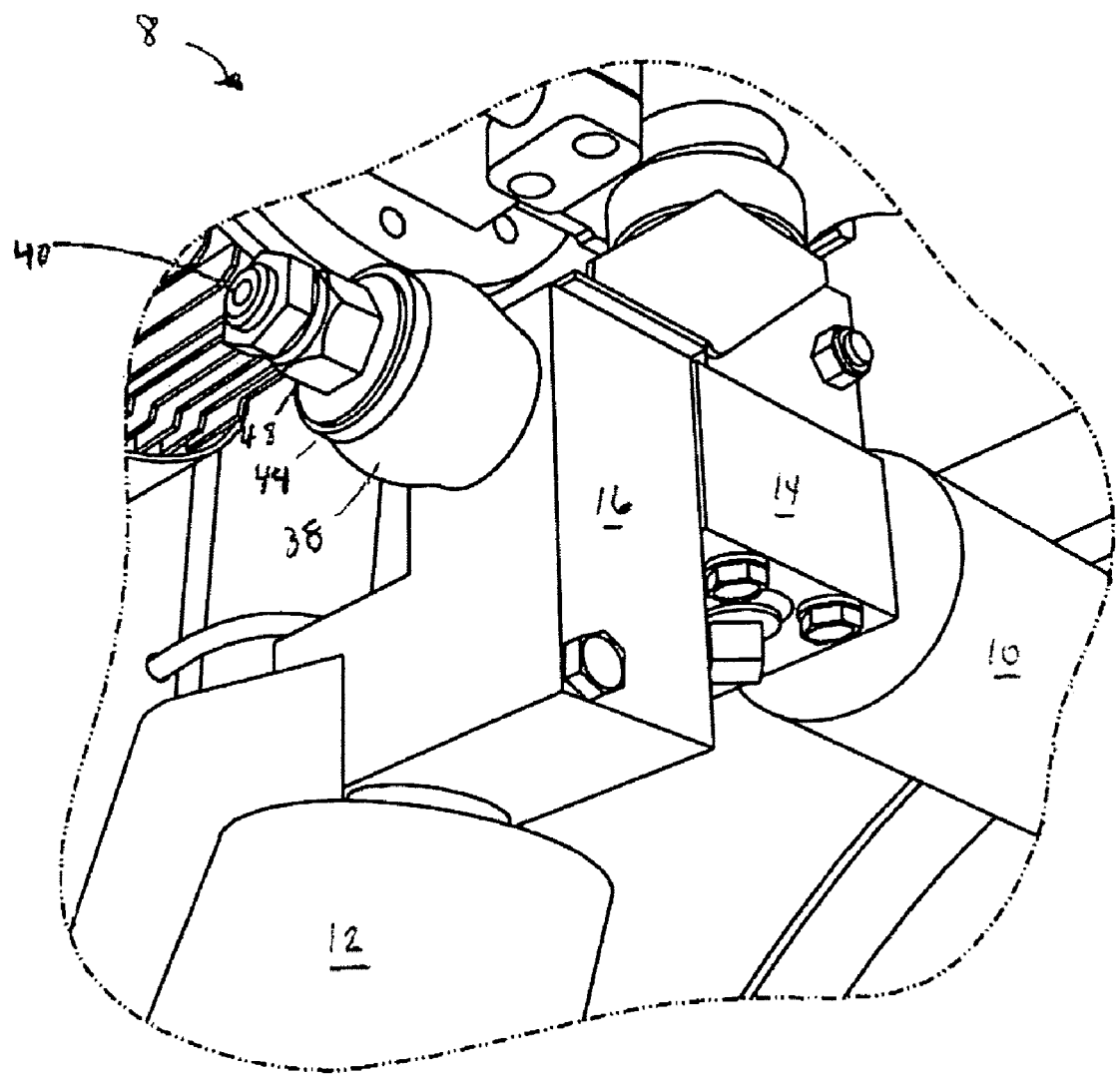
FIG. 6 is a closer view of FIG. 5.
Figure 7:
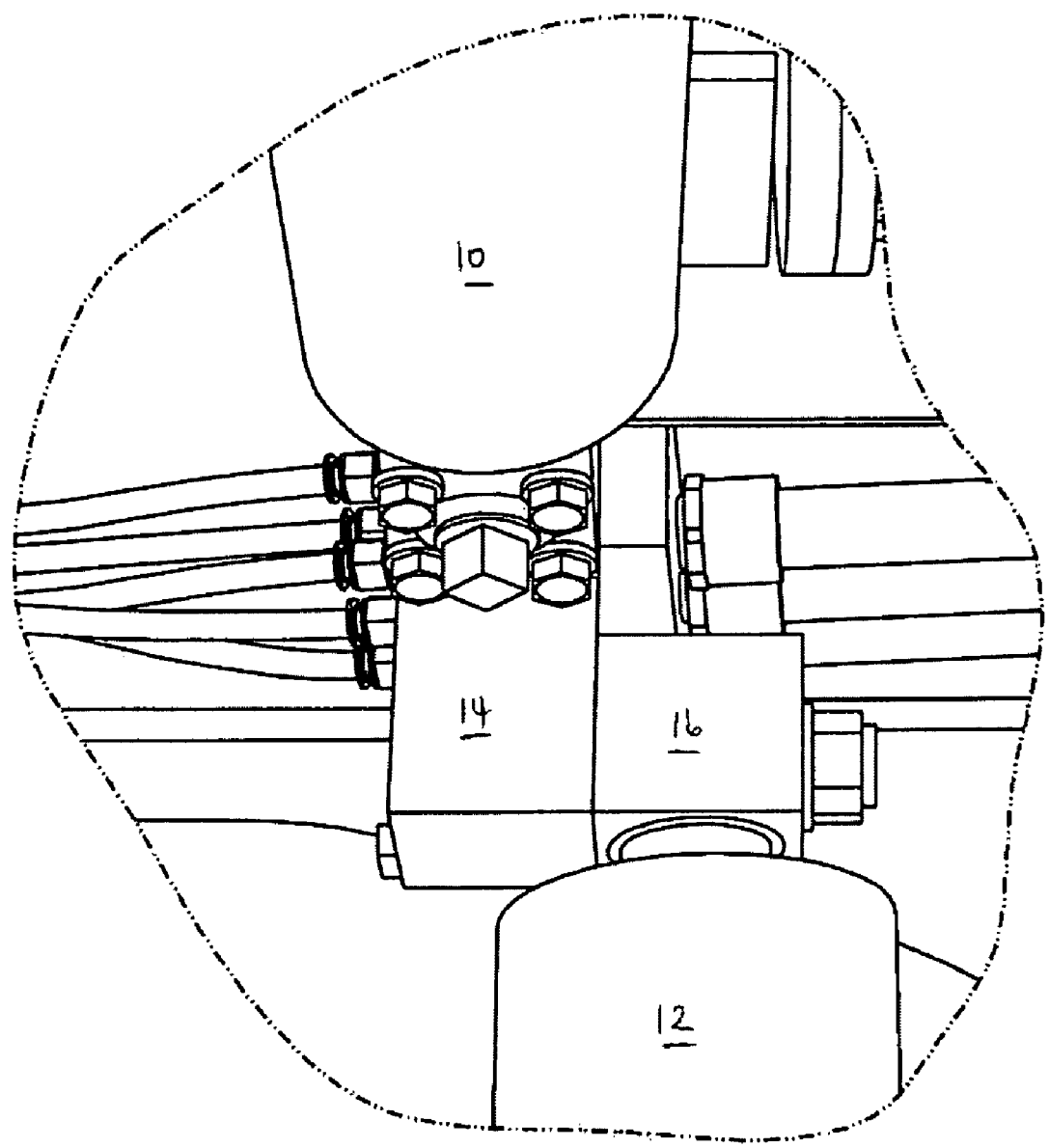
FIG. 7 is a perspective view of a preferred embodiment taken from between the vertical and horizontal arm of the device.
Figure 8:
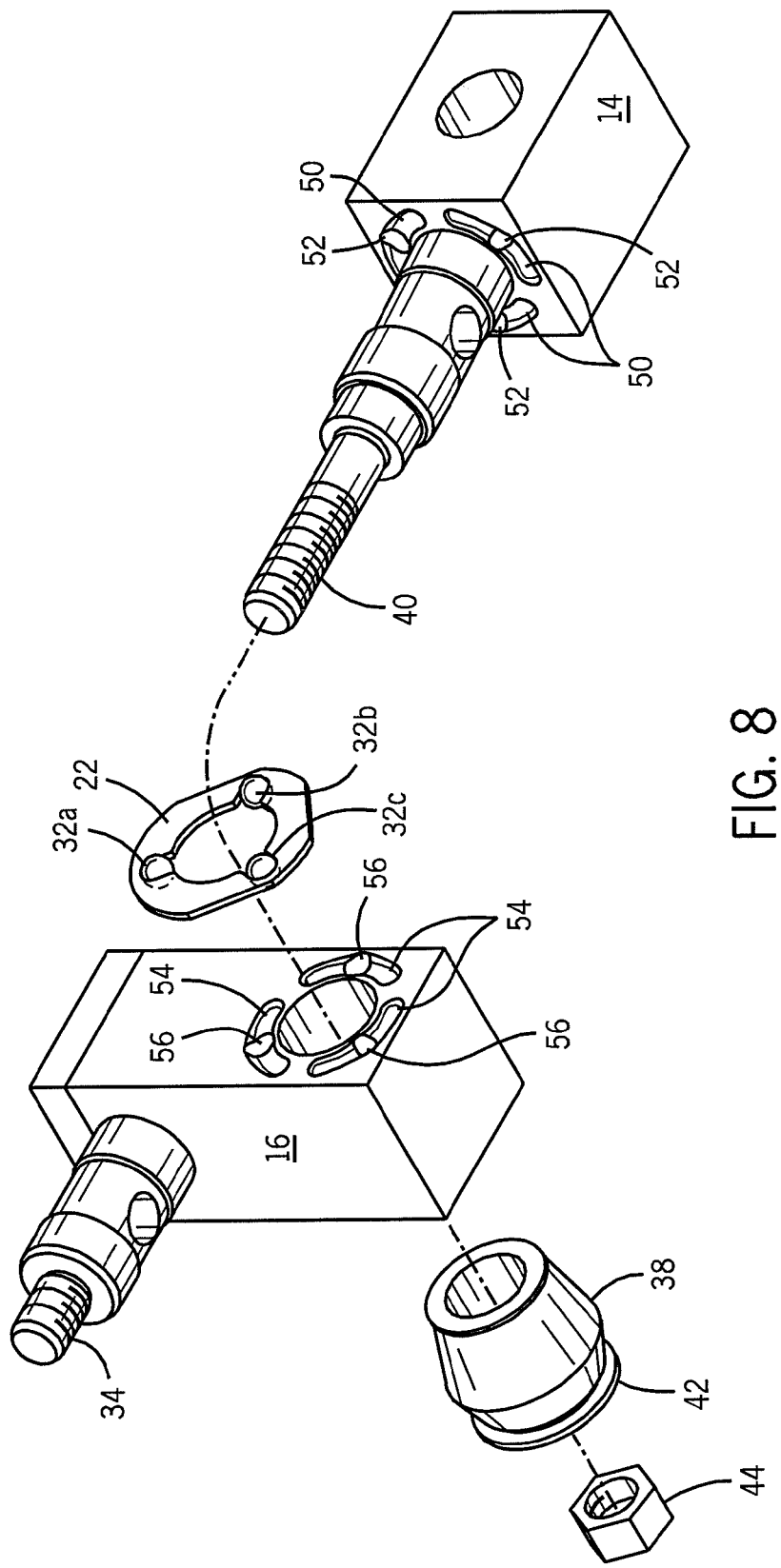
FIG. 8 is side angle exploded view of FIG. 4.

As seen in FIGS. 1 and 2, knuckle assembly 18 preferably comprises a ball retainer 22 preferably comprising three ball retainer detents 30a-c and three corresponding ⅜-inch stainless steel ball bearings 32a-c. As shown in FIG. 8, first portion 14 further comprises semi-circular detents 50 as shown, and are machined such that the center portion 52 of each detent 50 is deeper than the end portions. Second portion 16 further comprises semicircular detents 54 as shown, the detents 54 being machined such that the center portion 56 of each detent 54 is deeper than the end portions. As shown in FIGS. 1, 4 and 8, ball bearings 32 rest in the deepest portion 52, 56 of detents 50, 54 and maintain a firm connection between first portion 14 and second portion 16. Alternately, detents in first and second portions 14, 16 could be machined such that one end is shallow, becoming progressively deeper toward the other end, still allowing ball bearings 32 to rest in the deepest portion 52, 56 of detents 50, 54.

As seen in FIG. 2, when vertical arm 12 impacts a vehicle or is impacted by a vehicle, ball bearings 32 roll to one or the other end portion of detents 50, 54, allowing displacement of the connection between first portion 14 and second portion 16 away from the direction of impact. Advantageously, ball bearings 32 are biased into place with a compression bumper or spring 38 and have a tendency to roll back into the deep portion 50 of detents 52 once the force of impact has been removed, allowing re-connection of first portion 14 and second portion 16 to occur without human intervention.

FIGS. 1 and 2 further show stem 34, which is preferably threaded for attachment to second portion 16. Turning now to FIG. 4, it can be seen that assembly 8 includes a thrust bearing 36, a compression bumper or spring 38, a stem 40 extending from first portion 18, and a connection assembly over stem 40, connection assembly comprising a washer 42, and a nut assembly 44. Thrust bearing 36 is preferably comprised of two ¼-inch thick plastic spacers; washer 42 is preferably a stainless steel ⅝-inch washer; and nut assembly 44 is preferably comprised of a Nylok nut and jam nut.

The embodiment described herein explains the best known mode of practicing the invention and will enable others skilled in the art to utilize the invention, but should not be considered limiting. Rather, it should be understood that the invention is not limited to the details of construction and arrangements of the components set forth herein, but is capable of other embodiments and of being practiced or carried out in various ways, and all such modifications and variations are within the scope of the claims set forth below. Further, various elements or features discussed or shown herein may be combined in ways other than those specifically mentioned, and all such combinations are likewise within the scope of the invention.

We claim:

1. A device for coupling a horizontal and a vertical arm of a car wash spray arch comprising:
    a first body comprising a threaded stem and plurality of arc-shaped detents arranged in a circle on a surface of the first portion, each of the arc-shaped detents comprising a deeper center portion;
    a second body comprising a surface and having an aperture through the surface for accommodating the threaded stem;
    a plurality of balls;
    a ball retainer assembly comprising a central aperture for the stem of the first body and an aperture for each of the plurality of balls; the ball retainer assembly being interposed between the first body and the second body
    a compression spring over the stem of the first body; and
    a fastener designed to bias the compression spring and the second portion towards the first portion so that the second body is permitted to rotate only as the balls rotate within the length of the arc-shaped detents in the first body.

2. The device of claim 1, wherein the first body carries the horizontal arm and the second body carries the vertical arm.

3. The device of claim 1, wherein the relative depth of the center portion urges a ball that has been moved to an end portion back into the center portion.

4. An in-bay vehicle wash system comprising:
    a car wash bay having a vehicle entrance;
    a vehicle wash area, and a vehicle exit;
    a gantry mounted above the vehicle wash area within the bay, wherein the gantry is movable toward the vehicle entrance and toward the vehicle exit to traverse the entire length of a vehicle in the wash area;
    a spray arch mounted on the gantry, wherein the spray arch has a generally horizontally extending arm and a generally vertically extending arm;
    a joint located between the horizontal arm and vertical arm, wherein the joint has a first portion connected to the horizontal arm comprising a threaded stem and a plurality of arc-shaped detents arranged in a circle on a surface of the first portion, each of the arc-shaped detents comprising a deeper center portion and a second portion connected to the vertical arm comprising a surface and having an aperture through the surface for accommodating the threaded stem, and wherein a breakaway knuckle assembly is interposed between the first and second portions, the breakaway knuckle assembly comprising
    a plurality of balls;
    a ball retainer assembly comprising a central aperture for the stem of the first body and an aperture for each of the plurality of balls; the ball retainer assembly being interposed between the first body and the second body;
    a compression spring over the stem of the first body; and
    a fastener designed to bias the compression spring and the second portion towards the first portion so that the second body is permitted to rotate only as the balls rotate within the length of the arc-shaped detents in the first body.

5. The vehicle wash system of claim 4, wherein the breakaway knuckle permits a first position in which the horizontal arm and vertical arm are in an operating position, and a second position in which the horizontal arm is displaced from the vertical arm.

6. A spray arch for an in-bay vehicle wash comprising:
    a generally horizontally oriented arm;
    a generally vertically oriented arm having a first, operating position, and a second, displaced position;
    a device interposed between the generally horizontally oriented arm and the generally vertically oriented arm, wherein the device allows displacement of the vertically oriented arm upon impact with an object, and wherein the device returns the vertically oriented arm to its operating position when the object is no longer in contact with the vertically oriented arm, the device comprising:
    a first body comprising threaded stem and a plurality of arc-shaped detents arranged in a circle on a surface of the first portion, each of the arc-shaped detents comprising a deeper center portion;
    a second body comprising a surface and having an aperture through the surface for accommodating the threaded stem;
    a plurality of balls;
    a ball retainer assembly comprising a central aperture for the stem of the first body and an aperture for each of the plurality of balls; the ball retainer assembly being interposed between the first body and the second body;
    a compression spring over the stem of the first body; and
    a fastener designed to bias the compression spring and the second portion towards the first portion so that the second body is permitted to rotate only as the balls rotate within the length of the arc-shaped detents in the first body.

* * * * *